April 22, 1941.     E. E. WEMP     2,239,163
CENTRIFUGAL CLUTCH AND VACUUM CONVERTER
Filed May 25, 1933     5 Sheets-Sheet 2
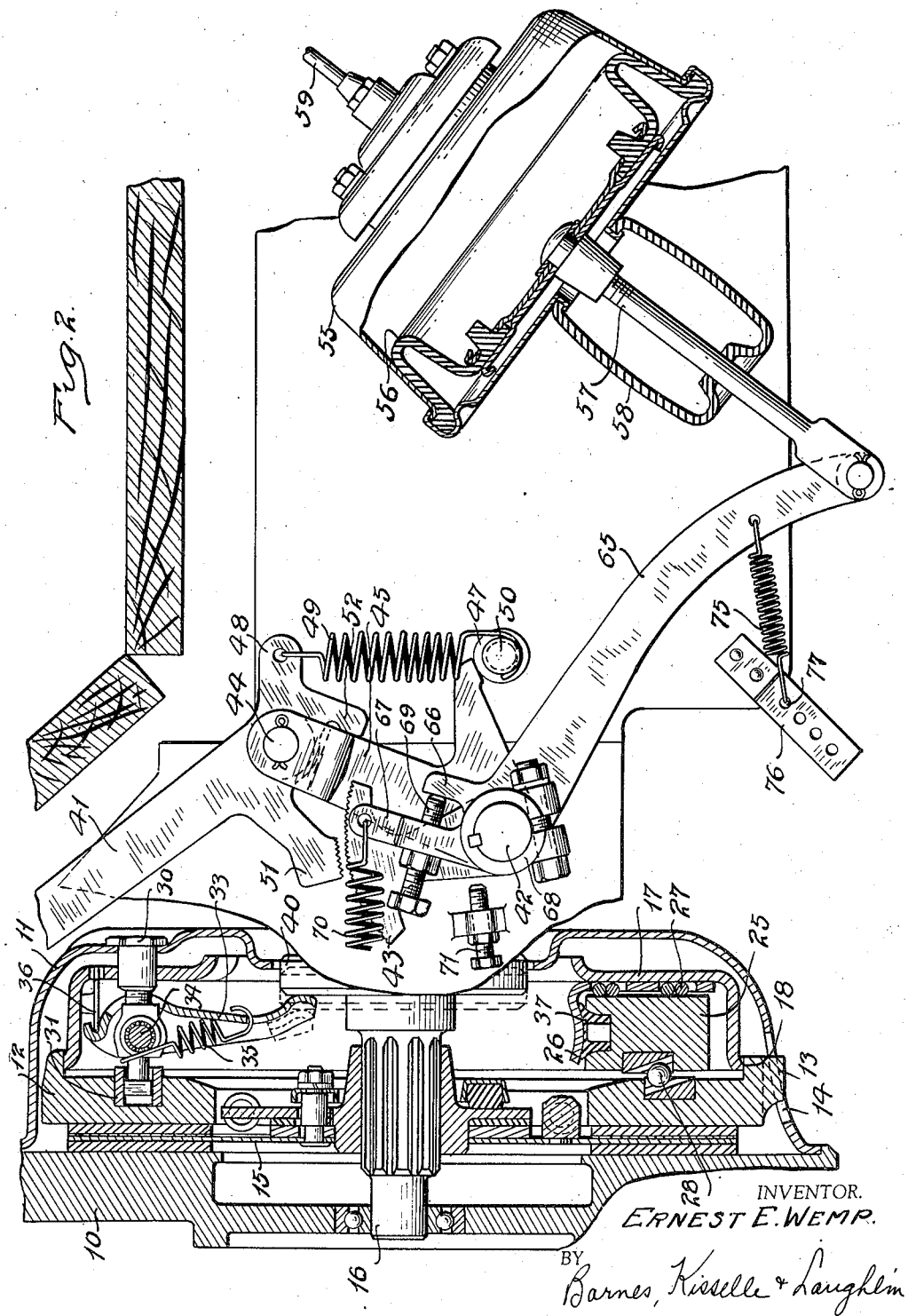
INVENTOR.
ERNEST E. WEMP.
BY
Barnes, Kisselle & Laughlin
ATTORNEYS.

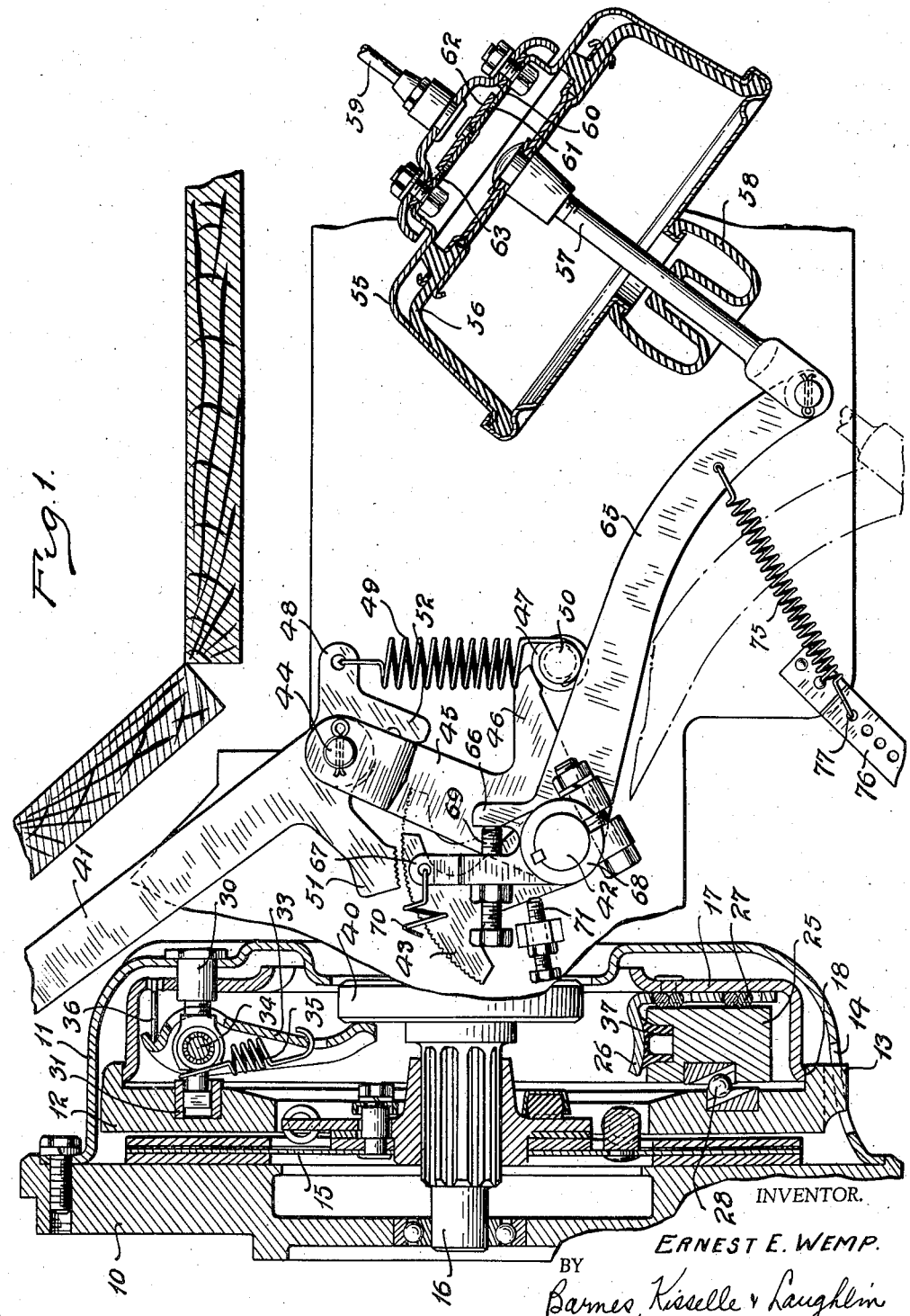

April 22, 1941. E. E. WEMP 2,239,163
CENTRIFUGAL CLUTCH AND VACUUM CONVERTER
Filed May 25, 1933 5 Sheets-Sheet 3
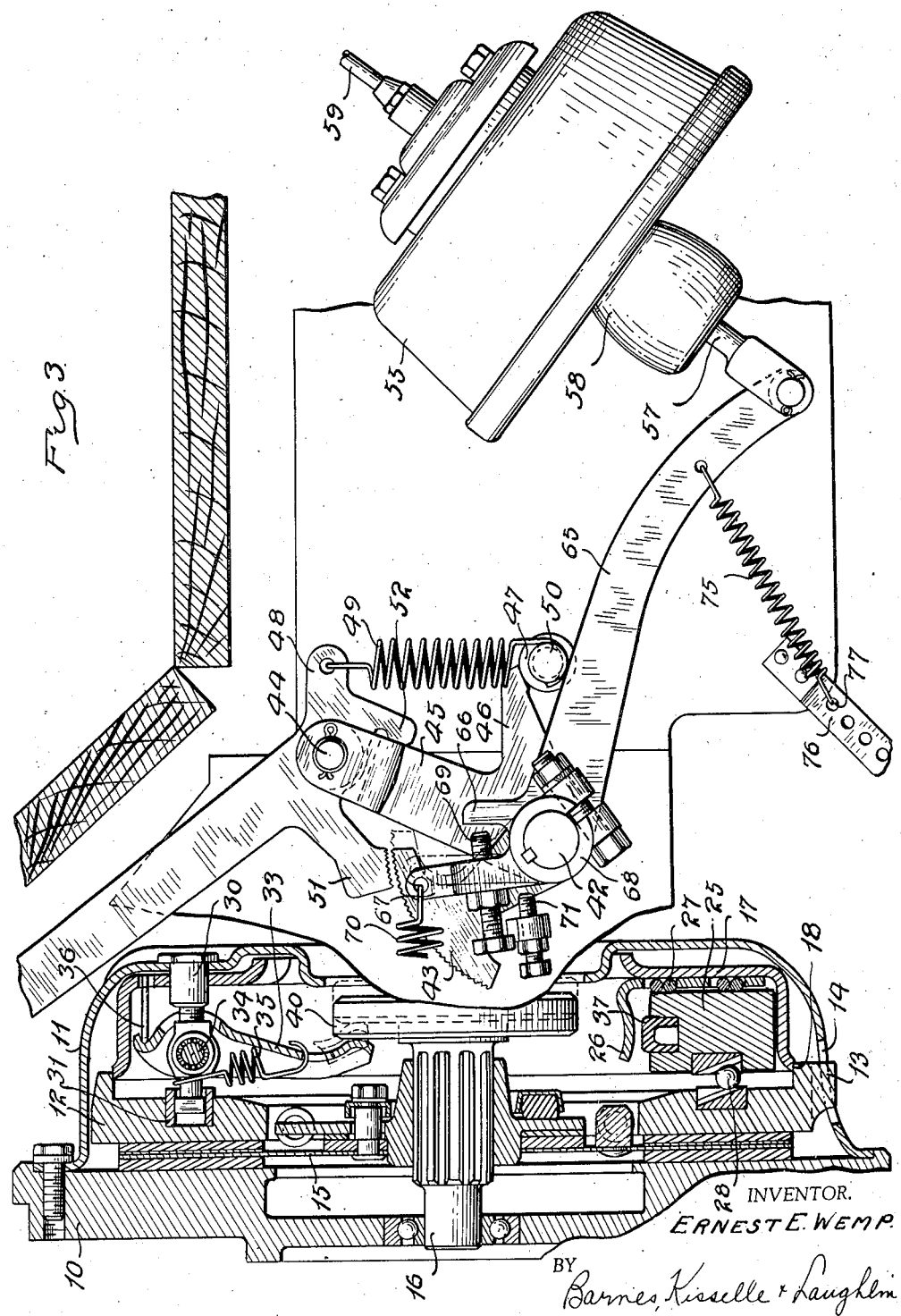
INVENTOR.
ERNEST E. WEMP.
BY Barnes, Kisselle & Laughlin
ATTORNEYS.

April 22, 1941. E. E. WEMP 2,239,163
CENTRIFUGAL CLUTCH AND VACUUM CONVERTER
Filed May 25, 1933   5 Sheets-Sheet 4
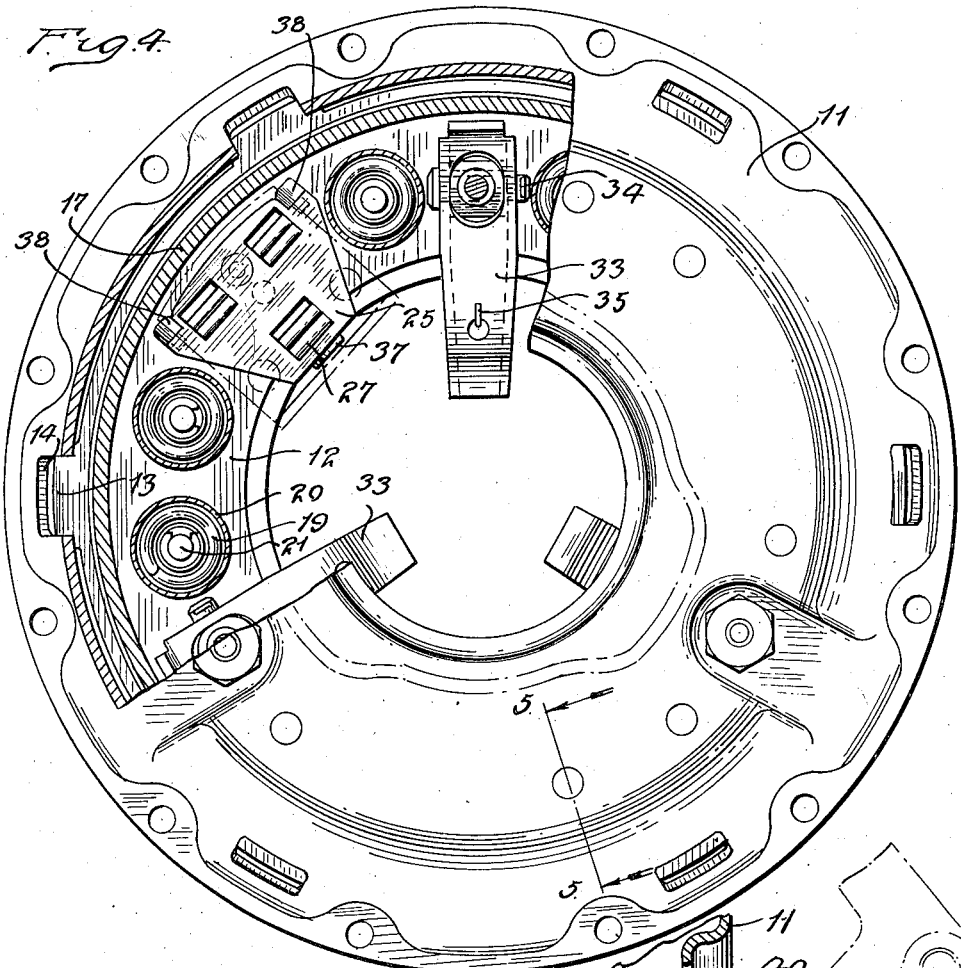
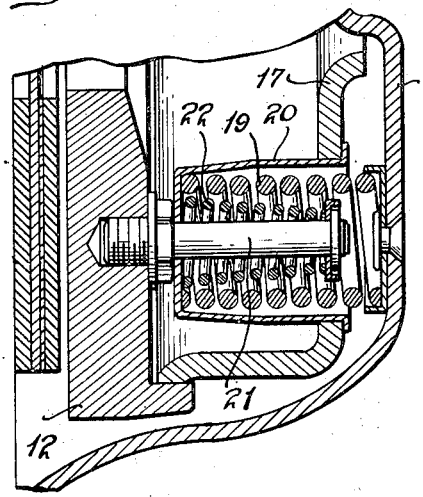
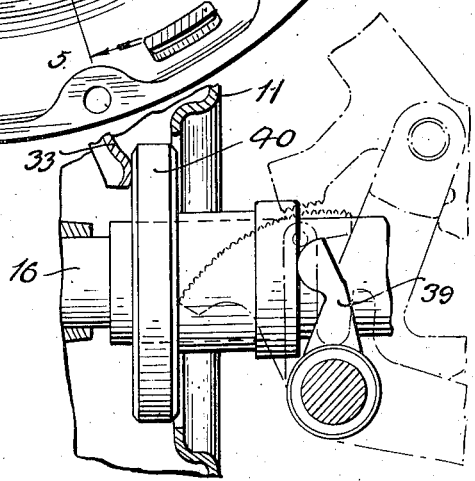
INVENTOR.
ERNEST E. WEMP.
BY Barnes, Kisselle & Laughlin
ATTORNEYS.

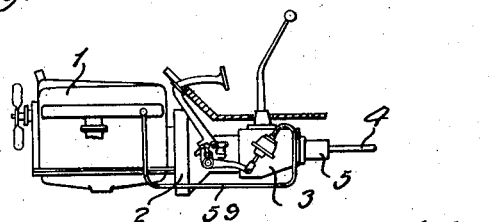
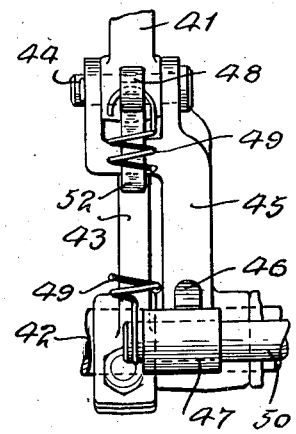
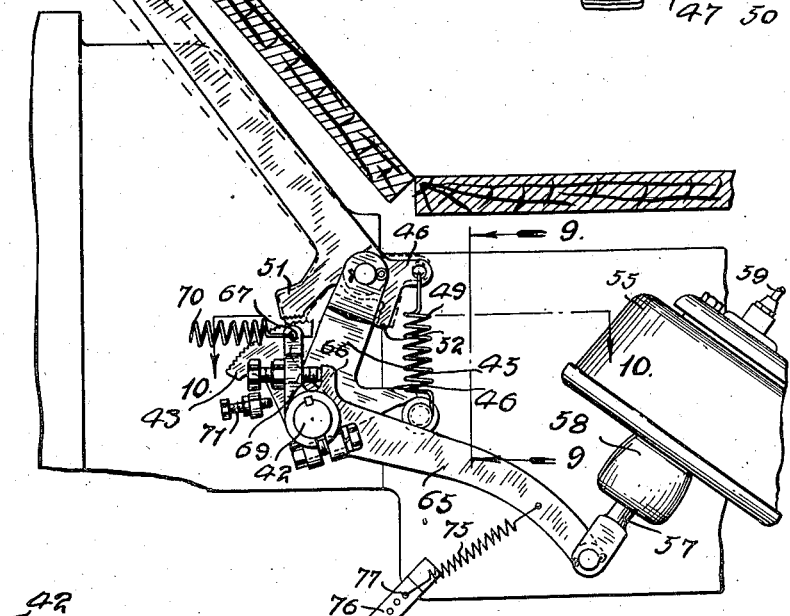
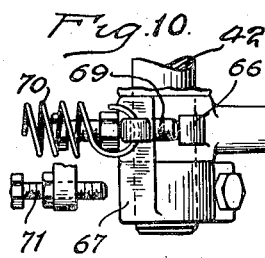

Patented Apr. 22, 1941

2,239,163

UNITED STATES PATENT OFFICE 2,239,163

CENTRIFUGAL CLUTCH AND VACUUM CONVERTER

Ernest E. Wemp, Detroit, Mich.

Application May 25, 1933, Serial No. 672,794

19 Claims. (Cl. 192—105)

This invention relates to centrifugal clutches, and it is concerned particularly with a combination embodying a centrifugal clutch and clutch actuating means for converting the same into a clutch of manual operation type. The invention aims to provide an improved clutch structure notwithstanding the fact the case is entitled "Centrifugal clutch and vacuum converter" as this title has been given to the case to aid in identifying it from certain other applications. The clutch structure itself embodies generally an arrangement such as shown in application Serial No. 672,793, filed May 25, 1933, now Patent No. 2,044,487 of June 16, 1936, with improvements in certain structural parts. In my application Serial No. 607,064, filed April 23, 1932, a centrifugal clutch is shown wherein an automatically acting mechanical contrivance is provided for converting the centrifugal clutch into a manual clutch when the parts cease rotating. The present invention is directed toward the provision of certain improvements in a conversion system, which improvements generally reside in the provision of clutch conversion means controlled by differential pressures. To this end the partial vacuum or depression in the engine intake manifold may be utilized for the purpose of actuating the clutch converter mechanism.

The centrifugal clutch is one preferably designed to be disengaged at the normal idling speed of an internal combustion engine. This usually is from 400 to 500 R. P. M. When the engine is accelerated, the clutch engages. The centrifugal clutch would ordinarily remain disengaged when the engine is stopped so that when an automotive vehicle is left standing the clutch would be open. However, the converter system forming a part of the present invention causes the clutch to become engaged substantially as the internal combustion engine comes to a stop, and in fact may be, what is termed herein, converted into a manual type of clutch. Moreover, the invention contemplates the combination embodying a centrifugal clutch and a vacuum controlled mechanism, working in conjunction therewith, by means of which an improved clutch action is obtained, and a clutch having centrifugal elements of relatively light weight can be used. This will be brought out more in detail as the detailed description progresses. Suffice to say at this time that under certain operating conditions a centrifugal clutch of light construction may not be able to transmit the torque; in other words, the clutch may slip. This is, of course, undesirable even though it is desirable to use light clutch weights for several other reasons as will later appear. However, the vacuum converter system, which operates in accordance with a condition in the intake manifold of the engine, acts upon the clutch in such a way as to prevent such slippage.

Fig. 1 is a view partly in section, illustrating a clutch and vacuum cylinder arrangement constructed in accordance with the invention showing the same in engine idling condition with the clutch disengaged.

Fig. 2 is a similar view showing the parts in at rest position with the clutch engaged.

Fig. 3 is a similar view showing the parts in normal operating condition with the clutch engaged.

Fig. 4 is a view of the clutch partly in rear elevation and with parts cut away showing some of the interior construction.

Fig. 5 is an enlarged sectional view taken substantially on line 5—5 of Fig. 4 showing the clutch packing spring arrangement.

Fig. 6 is an enlarged detail view showing the normal operating means for the clutch.

Fig. 7 is a general view illustrating an internal combustion engine and general environment for the clutch.

Fig. 8 is a view in side elevation showing a clutch control lever and mounting which may be used.

Fig. 9 is an enlarged view looking substantially in the direction of arrows 9—9 of Fig. 8.

Fig. 10 is a view looking substantially on line 10—10 of Fig. 8.

Referring first to Fig. 7: An internal combustion engine is shown at 1, a clutch housing at 2, the usual transmission case at 3, and a vehicle driving shaft at 4. The clutch arrangement of the present invention may most advantageously be employed with a free wheeling unit which may be disposed between the transmission 3 and shaft 4 as, for example, at 5. These free wheeling units are well-known, and may take any one of various structural forms, and they provide a one-way driving action so that the shaft 4 may overrun the engine.

The clutch structure is inside the housing 2 and, as shown in Fig. 1, may have one driving member 10 which may be a flywheel equipped with a usual clutch cover plate 11. The clutch structure is confined in the cover plate and it is desirable that the structure be compact and the present invention makes it feasible to use a clutch cover 11 of substantially the same dimensions as clutch covers conventionally in use today, notwithstanding the fact that the centrifugal clutch embodies a number of additional elements including centrifugal weights, etc. A clutch driving member, in the form of a pressure ring, is shown at 12, and it may have projections 13 lying in slots 14 of the cover plate for driving purposes. A clutch driven disc is shown at 15, the hub of which is mounted upon a driven shaft 16 in driving relation therewith. A back plate of annular form, as at 17, is mounted within the cover and it may be piloted by the pressure ring as at 18, and this back plate is acted upon by a series of packing springs 19 (Fig. 5) reacting against the cover 11 and the bottom of cups 20 carried by the back plate. Studs 21 are taken in the pressure ring 12 each of which projects telescopically into the cup 20 and spring 19, and a retracting spring 22 may be associated with each stud and acts against the packing spring 19, but of course, is of much less strength. The springs are arranged as illustrated in Fig. 4. The back plate also carries radially shiftable centrifugal weights 25 which stop inwardly against brackets 26 and outwardly against the peripheral portion of the back plate. The brackets 26 are secured to the back plate, and the centrifugal weights are backed up preferably by anti-friction bearings 27, and co-act with the pressure ring by inclined surface means which may comprise a ball 28 pocketed in recesses with inclined surfaces as shown. The springs 22, in retracting the pressure ring, exert a force through the balls 28 and the inclined planes to hold the weights inwardly against the stops 26 as shown in Fig. 1.

The cover plate carries studs 30, the inner ends of which may be supported slidably by fitting into bushings 31 in the pressure ring, and on these studs clutch operating levers 33 are mounted to rock on an axis as at 34, and an anti-rattling spring 35 may be associated with each lever. The levers may fulcrum against fulcrum blocks 36 backed up by the back plate. The several centrifugal weights are preferably each provided with a rubber bumper 37 for stopping against the bracket 26, and with rubber bumpers 38 (Fig. 4) for stopping against the peripheral flange of the back plate 17. Preferably also the bearings 27 are three in number to provide a three-point backing for each weight as shown in Fig. 4; preferably the clutch operating levers are three in number; and preferably the weights are three in number each having a single co-acting contact with the pressure ring through the means of the ball 28. The clutch, as thus far described, save for an arrangement of the mounting of the back plate and the driving arrangement for the back plate, is the same in principle as the clutch covered in my application Serial No. 672,793.

Aside from other instrumentalities having a bearing on the clutch it operates as follows: At normal engine idling speed, the centrifugal weights 25 are positioned substantially as illustrated in Fig. 1 and the clutch is open. Upon acceleration the weights 25 move outwardly to a position as illustrated in Fig. 3 and through the means of the balls 28 and the wedging surfaces, the pressure ring 12 is forced up against the driven disc and the driven disc is packed between the flywheel and the pressure ring. This movement of the weights forces the back plate away from the pressure ring and toward the cover plate and against the compressing action of the clutch packing springs 19. When the parts again reach idling speed the clutch will automatically disengage with the parts assuming the position as illustrated in Fig. 1.

The next item to be considered, as regards the operation of the clutch, is that when the engine is brought to complete stop, the parts automatically take the position as illustrated in Fig. 2 and the clutch is again engaged so that a vehicle may be left in gear with the engine serving as a braking agency, and so that power may be transmitted from the traction wheels to the engine where it is desirable or necessary to start the engine by vehicle movement. It will be apparent that the levers 33 rock as the back plate 17 shifts axially. The clutch packing springs are tending, at all times, to shift the back plate toward the pressure ring, thus tending to rock the lever 33 (Fig. 1) counterclockwise. This would engage the clutch, but a clutch throw-out member 40 stops the levers, thus holding the clutch disengaged in the Fig. 1 position. When the clutch is engaged the inner ends of the levers rock toward the pressure ring as illustrated by the dotted-line and full-line positions in Fig. 3. Means are provided for keeping the throw-out bearing 40 up against the throw-out levers so that as the levers shift in clutch engagement and disengagement the throw-out bearing follows the same and maintains a contact therewith.

A clutch throw-out lever is illustrated at 41 and it is preferred that a special form of lever arrangement be used with the clutch structure. This arrangement may be of the type as shown in my Patent No. 1,830,306 of November 3, 1931, wherein the lever and the rock shaft for operating the clutch are disconnected when the clutch engages and the lever retracts to normal position. This permits of movement of the clutch rock shaft independently of the foot lever. The foot lever arrangement shown herein is an improvement over that shown in the patent and is covered in a separate patent application. The usual rock shaft is shown at 42, and it is provided with a yoke 39 which acts upon the clutch throw-out bearing 40. Keyed to the rock shaft is a serrated segment member 43. The lever 41 is pivoted as at 44, which may be termed a knee joint, on a lever section 45 pivotally mounted upon the shaft 42 and having a heel 46 adapted to abut a suitable stop 47. The lever 41 has a heel 48, and a coil spring 49 which is a tension spring, as shown, connects the heel 48 and hooks around a suitable bracket or part 50. The lever 41 has a serrated shoe 51, and a finger 52 arranged to contact with a part of the lever section 45. When the lever 41 is at rest, it is retracted against the floor boards as illustrated in Fig. 8, or other suitable stop by the spring 49. The spring 49 tends to rock the lever 41 around the knee joint 44, and the finger 52 contacts with the part 45. The result is that the spring 49 holds the heel 46 against the stop 47. With the parts in these positions the serrated shoe 51 and the serrated segment 43 are separated as shown in Fig. 1. Accordingly, the rock shaft 42 may actuate without movement of the lever 41. An operator may depress the pedal 41, and the pedal first fulcrums around the point 44. The proportions of the parts and the spring tension on the lever 41 and the keyed part 45 must be such that the turning moment which the spring 49 exerts on the member 45 in a clockwise direction, as Fig. 1 is viewed, is greater than the turning moment exerted on the member 45 when the lever 41 is depressed in order to break the knee joint 44. The result is that the lever moves through a certain amount of lash movement, to a position illustrated by the dotted lines in Fig. 8 and the shoe 51 moves into engagement with the serrated segment 43, and thence further movement of the lever moves the segment 43 and shaft 42. As mentioned above, this particular arrangement is covered in more detail in another application.

A vacuum motor is shown at 55 having a diaphragm 56 of rubber or the like to which is connected a rod 57 closed by a rubber dust sealing element 58, and a vacuum line 59 connects the motor to the intake manifold of the engine as shown in Fig. 7. The head of the vacuum motor may have a sheet metal head 60 provided with a suitable number of apertures 61 over which is secured a flexible disc 62 of rubber or the like, and a bleeder port 63 clear of the rubber disc may be provided. Vacuum created in the manifold shifts the diaphragm and rod 57 to a position as illustrated in Figs. 1 and 3 and, in the absence of a differential pressure, the diaphragm and rod may shift to a position as illustrated in Fig. 2. The vacuum motor is, in the present structure, open to the atmosphere on the side of the diaphragm opposite the vacuum line 59. This may be accomplished by the provision of one or more apertures (not shown) in the rubber dust sealing element 58.

Connected to the rod 57 is an arm 65 having a projecting part 66, and this arm may be pivotally mounted upon the clutch control rock shaft 42. An arm 67 has a hub part 68 keyed to the shaft 42 and it may have an adjustable screw stop 69 for contact with the projection 66. A spring 70 of fairly light construction and action exerts a torque action upon the arm 67, and a suitable stop 71 may be provided for limiting the movement of the arm 67 and rock shaft 68.

Briefly reiterating the structure centering on the rock shaft, it will be noted that the manual control comprises the serrated segment 43 keyed to the shaft, and the lever part 45 rockable on the shaft in addition to the lever 41. These parts are usually on the shaft on one side of the engine. However, Figs. 1, 2, and 3, in order to be complete, have also shown the parts associated with the vacuum motor. These parts which are associated with the vacuum motor comprise the link 65 pivoted on the rock shaft and having the projection 66, and the arm 67 keyed to the shaft. The cooperating parts 65 and 67 are advantageously, in a commercial structure, mounted upon the shaft on the opposite side of the engine. The operation will be rendered clear, it is believed, by keeping in mind that cooperating parts 65 and 67 on the one hand are entirely dis-associated from the lever parts 43 and 45 except through their mounting upon the shaft 42.

Considering now the operation: Assume that the engine is idling—the parts will be in a position shown in Fig. 1, with the clutch disengaged due to the fact that the centrifugal weights are inoperative, and due to the fact that the depression or partial vacuum in the manifold of the engine has shifted the diaphragm to the position shown. This holds the arm 65 solidly with the projection 66 backing up the member 67, which is keyed to the rock shaft, with the result that the yoke 39 holds the throw-out member 40 in the position shown. The clutch throw-out levers 33 back up against the throw-out member and are impeded from further movement.

Now assume that the engine is accelerated: The centrifugal weights may shift to the position shown in Fig. 3 thus engaging the clutch and backing away the back plate 17, thus compressing the packing springs 19. In this action the back plate shifts the clutch throw-out levers from the dotted-line position to the full-line position shown in Fig. 3. The clutch throw-out bearing 40 follows up the levers and this may be caused by the coil spring 70 pulling on the arm 67 and rocking the shaft 42. This pulls the stop 69 away from the projection 66 as illustrated in Fig. 3. Also it shifts the serrated segment as will be noted by a comparison of Figs. 1 and 3. If the engine be again brought down to idling speed, the centrifugal weights shift back to the Fig. 1 position, the packing springs shift the back plate towards the left as the figures are viewed and the levers 33 push the throw-out member 40 to the right tensioning the spring 70 and shifting the rock shaft, arm 67, and serrated segment 43, all back to the Fig. 1 position.

Now suppose that the engine is brought to a stop as by turning off the ignition: The depression in the vacuum motor is released and a bleeding action takes place through the bleeder port 63 so that the diaphragm no longer holds the link 65 and its projection 66 in a position to prevent clockwise rotation of the shaft 42. Accordingly, the clutch packing springs shift the back plate 17 and pressure ring to the left to engage the clutch as shown in Fig. 2, in which action the levers 33 rock from the dotted-line position to the full-line position backing away the throw-out member. This, of course, also rocks the shaft 42, the serrated segment 43, and the arm 67.

Thus, it will be noted that there are at least three major positions which the clutch throw-out levers 33 may take in the automatic action of the clutch and that the clutch throw-out member 40 and the levers are at all times substantially in contact with each other. When the engine stops and the parts come to the position as illustrated in Fig. 2, the clutch has been in what may be termed converted into a manual type of clutch. In other words, the centrifugal weights are ineffective and the clutch springs engage the clutch just like the ordinary clutch of today. It will be apparent that the clutch may be disengaged at any time by manual operation of the lever 41. While the segment 43 has shifted from position to position, yet the lever 41 has remained stationary and the lash movement is constant at any time. By pressing the lever 41 it moves through a lash movement until its shoe 51 grips the segment 43 and then continued movement of the lever retracts the back plate, the centrifugal weights, and pressure ring bodily without overcoming centrifugal force. This action may take place during the at rest position or during the operation and engaged position, and since the throw-out member 40 follows the levers disengagement of the clutch starts as soon as the shoe 51 grips the segment 43. This provides for a maximum range of lever movement in releasing the clutch. Inasmuch as the parts are housed in a small clutch cover there is the possibility that an operator would depress the pedal too far so as to cause the levers to jam against some of the clutch parts near the hub and for this purpose the stop 71 is provided to limit the rocking movement of the shaft 42 by physical effort of the operator.

The vacuum control mechanism or vacuum converter system, as it may be termed, has another important and automatic function during vehicle operation and this function permits of use of light weights in the centrifugal clutch. The use of light weights is desirable to save space and also to provide for a nicety of clutch engagement when getting the vehicle under way in low gear, at which time the engine is rotating at a relatively high R. P. M. and there is a chance for a too rapid clutch engaging action. The light weights minimize this chance. However, there are conditions where the engine is operating under full torque but the R. P. M. is not high. This may occur when the engine is under heavy load in high gear, and one example may be visualized in a long hard up-hill pull with the vehicle materially decelerated. Under such conditions as these, a centrifugal clutch may slip because the centrifugal action is reduced by the low R. P. M., yet the torque is high. Generally, however, where such conditions arise, the depression in the intake manifold is low because the engine is working on a wide open throttle, or substantially a wide open throttle. This means that pressure in the manifold begins to approach atmospheric pressure. Accordingly, the diaphragm in the vacuum motor may no longer be held in the Fig. 1 position and may start shifting back to the Fig. 2 position. When this occurs, the entire assembly, including the back plate, pressure ring and intermediate weights, shift forward under action of the clutch packing springs and the clutch becomes engaged even though the centrifugal weights are only partially effective. Under this condition, the centrifugal weights may be in a position somewhere between the extreme positions illustrated in Figs. 1 and 2. Accordingly, the clutch is automatically converted to a manual type of clutch when the torque is high and the R. P. M. is low. The weights of the clutch and the arrangement of the converter mechanism may be calculated to produce a proper action or conversion. Of course, as soon as the engine picks up speed again, the clutch automatically is converted to a centrifugal type and the diaphragm moves back to the Fig. 1 position.

The clutch may, for example, be fully engaged by the centrifugal weights at a speed of from 900 to 1000 R. P. M. The manual operation of the clutch makes the use of the structure feasible under a condition where it is necessary to keep the engine operating at an R. P. M. higher than normal idling speed as is the case when the engine is cold. In this case the clutch may be manually engaged and released like the conventional clutch at the present time. Occasionally it may be desirable to release the clutch at a high engine speed in order to take advantage of the flywheel inertia in jumping a car out of a hole or the like, and this may be done manually. It is to be noted that a manual clutch releasing lever constructed to permit movement of the clutch throw-out levers and associated parts, without lever movement, is particularly advantageous for use in connection with the present invention. A conventional clutch pedal would have to be connected to the rock shaft so as to permit the throw-out bearing 40 to recede to the Fig. 2 position without first coming against the toe boards; then on the change over from the at rest position (Fig. 2) to the idling position (Fig. 1) the clutch throw-out levers would move away from the throw-out bearing; then on the change over from the idling condition to the operating condition the clutch throw-out levers would move still further away from the throw-out bearing. The obvious result of this would be that an ordinary clutch lever would have to be depressed through a long range of movement in order to bring the throw-out bearing up against the clutch levers, thus leaving only a very small, and probably, too small a range of movement to disengage the clutch manually. At any rate, the clutch could not be disengaged with facility under these conditions. However, a lever with a specially long range of movement could be used with the clutch and some of the appended claims herewith recite this arrangement irrespective of the type of lever used.

Moreover, the lever hook up automatically compensates for wear in the clutch facings since the clutch throw-out levers, the throw-out bearing, the rock shaft, the serrated segment and associated parts may shift progressively in clutch engaged condition as the facings wear away without disturbing the normal foot pedal position. This, however, is covered more in detail in the application covering the lever structure. In some of the claims attached hereto it is specified that the vacuum converter means is connected to the engine manifold; that the means which works by differential pressure is a vacuum controlled means; that the releasing lever is a normally operable lever; these terms are used for the purpose of convenience and it is to be understood that the vacuum controlled means may be connected to any part of the engine which would perform an action equivalent to connecting it to the manifold, that the vacuum means may operate by a partial vacuum and does not necessarily have to be a means working on a high vacuum, and that the lever for manual control may be worked by the foot of the operator, and in fact it is expected that the lever be so operated in the usual installation.

It is, of course, to be appreciated that different vehicles, depending upon their power and weight largely, have clutches of varying torque capacities. This means that more force is required to impede the packing springs in some clutches than in others. So far as the present invention is concerned different forces can be accommodated by varying the size of the vacuum motor, or the leverage through which it works. However, it is believed to be preferred to use a standard size vacuum motor large enough to take care of a clutch of high torque capacity and through means of additional elements, adapt this vacuum motor for use on smaller jobs. This may be done by adding an element, such as a spring 75, for working against the vacuum acting upon the diaphragm. This spring may be an extension spring, as shown, and may be connected to the arm 65 and to another fixed member, such as a bracket 76, which may be provided with a number of apertures 77.

By selecting a spring of proper strength the effective force of the lever 65 on the clutch may be determined as desired. With a heavy duty clutch the vacuum motor may be used without a spring, or with a spring of little strength, and the same vacuum motor can be used with smaller clutches by selecting stronger springs. Instead of selecting springs, one end of the spring may be adjustably connected into any one of the series of apertures 77. Furthermore, such an arrangement gives an altitude adjustment. Cars shipped, for example, to high altitudes may have the spring connected to an aperture suitable for conditioning the vacuum motor for proper operation in such altitude.

The term "depression" has been used herein as synonymous to the term "partial vacuum." In the present instance the depression or partial vacuum is a pressure less than atmospheric pressure. However, the pressures on opposite sides of the diaphragm may be higher or lower than atmospheric pressure, and the meaning which is intended to be conveyed by the use of the term depression is that the pressure on one side of the diaphragm is reduced below that of the pressure on the opposite side of the diaphragm. In other words, the pressure on one side is depressed relative to the pressure on the opposite side, whether or not this be considered technically a partial vacuum. The term "depression" is quite commonly used in the art in this connection and has been adopted as a convenient term.

Some of the claims make reference to the fact that the motor or vacuum control means is connected to the intake manifold. The connecting of the vacuum motor to the piping conveying the fuel to the engine (whether technically considered a manifold or not) to create a depression or partial vacuum in the motor is the full equivalent of connecting to the manifold, as specified herein, and such term is to be construed as covering such equivalent structure.

I claim:

1. The combination with an internal combustion engine, of a clutch having driving and driven members, centrifugal means carried by a clutch driving member for engaging the clutch above a given speed of rotation and for releasing the clutch below said speed of rotation, an element shiftable by differential pressure located in a chamber, an open conduit constantly connecting one side of the chamber to the intake manifold of the engine, said element being shiftable upon variation in the depression in the engine manifold, and means operatively connecting the element to the clutch.

2. The combination with an internal combustion engine, of a clutch having driving and driven members, centrifugal means for engaging the clutch at an R. P. M. above engine idling speed and arranged to release the clutch substantially at idling speed, means tending to engage the clutch at all times, means for impeding the engaging movement including an element shiftable by differential pressures and disposed in a chamber connected to the engine intake manifold whereby said element is held positioned by a relatively high depression in the manifold, so that the clutch is held open when the engine is idling, said element being shiftable when the depression in the manifold is relatively low whereby to permit engagement of the clutch under the action of said means tending to engage the clutch to substantially offset the loss of centrifugal force for engaging the clutch when the engine is operating at high torque and at a relatively low R. P. M.

3. The combination with an internal combustion engine, of a clutch having driving and driven members, clutch packing springs tending to engage the clutch, vacuum controlled clutch converter mechanism operating from the depression in the intake side of the engine for holding the clutch disengaged against the action of the packing springs, centrifugally controlled means for engaging the clutch at an R. P. M. above normal engine idling speed and for releasing the clutch substantially at idling speed, said vacuum controlled converter mechanism being rendered inoperative when the engine stops whereby the clutch is substantially converted into a spring engaged form of clutch and becomes engaged.

4. The combination with an internal combustion engine, of a clutch having driving and driven members, clutch packing springs tending to engage the clutch, vacuum controlled clutch converter mechanism operating from the depression in the intake side of the engine for holding the clutch against the action of the packing springs, centrifugally controlled means for engaging the clutch at an R. P. M. above normal engine idling speed and for releasing the clutch substantially at idling speed, said vacuum controlled converter mechanism being coordinated with the centrifugally controlled means whereby, when the clutch engaging action lessens by reason of the engine operating at a low R. P. M. and at high torque capacity, with the depression in the intake side of the engine lowered, said converter mechanism shifts to permit the clutch to engage under the action of said springs, to substantially counteract the lessening of the clutch engaging action by centrifugal force.

5. The combination with an internal combustion engine, of a clutch having driving and driven members, centrifugal means for engaging the clutch at an R. P. M. above engine idling speed and for releasing the clutch substantially at idling speed of the engine, and means operable by differential pressures and acted upon by the partial vacuum created in the intake side of the engine for holding the clutch open when the engine is idling, said means being so coordinated with the centrifugal means whereby, when the clutch packing action of the centrifugal means lesens by operation of the engine at a relatively low R. P. M. and at high engine torque, the vacuum controlled means shifts by reason of the relatively low depression in the intake side of the engine to permit of a clutch engaging action calculated to supplement the lessened clutch engaging action effected by centrifugal force.

6. The combination with an internal combustion engine, of a clutch having driving and driven members, clutch packing springs tending to engage the clutch, means for impeding the action of the springs, vacuum controlled means operating off the intake side of the engine for holding the impeding means in impeding position when the engine is idling so that the clutch is held open, centrifugal means for engaging the clutch ineffective at engine idling speeds and effective at an R. P. M. above engine idling speeds, said vacuum controlled means and centrifugal means being so coordinated that when the centrifugal force for engaging the clutch lessens by engine operation at a relatively low R. P. M. and at high torque capacity, the vacuum controlled means shifts by reason of the lowered depression in the intake side of the engine to render the impeding means ineffective.

7. The combination with an internal combustion engine, of an automatically acting centrifugal clutch having centrifugally controlled members of insufficient weight to provide requisite torque capacity when the engine is operating at a relatively low R. P. M. and at a high torque, and vacuum controlled means operating off the intake side of the engine and operatively associated with the clutch and arranged to effect an increase in the clutching action to supplement the lessened clutch action obtained centrifugally under the conditions above mentioned.

8. The combination with an internal combustion engine, of a centrifugally controlled clutch having centrifugally shiftable members of a weight insufficient to effect a clutching action of adequate torque capacity when the engine is operating at a relatively low R. P. M. and under high torque, at which time the depression in the intake side of the engine is relatively low, clutch packing springs, vacuum controlled means operating off the intake side of the engine and rendering the clutch packing springs ineffective when the depression is high, and arranged to render the packing springs effective when the depression in the intake side of the engine is relatively low.

9. The combination with an internal combustion engine, of an automatically acting centrifugal clutch having centrifugal members of a weight insufficient to provide adequate torque capacity to prevent clutch slippage when the engine is operating at a relatively low R. P. M. and at a high torque, at which time the depression in the intake side of the engine is relatively low, clutch packing springs tending to engage the clutch, vacuum controlled means operating off the engine manifold for maintaining the springs ineffective for engaging the clutch when the depression is relatively high and arranged to render the springs effective when the depression is relatively low, whereby the loss of centrifugal force under the conditions above mentioned may be supplemented by the clutch packing springs to prevent clutch slippage.

10. The combination with an internal combustion engine, of an automatically acting centrifugal clutch having centrifugal members of a weight insufficient to provide adequate torque capacity to prevent clutch slippage when the engine is operating at a relatively low R. P. M. and at a high torque, at which time the depression in the intake side of the engine is relatively low, clutch packing springs tending to engage the clutch, vacuum controlled means operating off the engine manifold for maintaining the springs ineffective when the clutch is disengaged and when the depression is relatively high, and arranged to render the springs effective when the depression is relatively low, whereby the loss of centrifugal force under the conditions above mentioned may be supplemented by the clutch packing springs to prevent clutch slippage, a manually controlled lever shiftable to release the clutch at any time during its engagement, and normally disconnected means between the clutch and lever arranged to permit clutch movement independent of the lever and arranged to establish an operable connection upon initial movement of the lever.

11. In combination, a clutch adapted for use with an internal combustion engine and having driving and driven members, packing springs tending to engage the clutch, vacuum controlled means for holding the clutch open at engine idling speed and operating off the intake side of the engine, centrifugally controlled means for engaging the clutch above engine idling speed and for releasing the clutch substantially at engine idling speed, clutch throw-out means shiftable as the clutch engages and releases centrifugally, a manually controlled clutch throw-out lever normally disconnected from the clutch throw-out means, and cooperating elements on the clutch throw-out means and lever establishing operable connecting between the lever and the clutch throw-out means upon initial movement of the lever.

12. The combination with an internal combustion engine, of a driven member to be driven thereby, a clutch for connecting the engine and the driven member, centrifugally controlled means mounted to rotate directly with the engine to engage and release the clutch in accordance with the speed of rotation of the engine, control means operating off the fuel intake piping of the engine for acting upon the clutch, and co-ordinated with the centrifugally controlled means to effect a certain increase in the clutching action upon a decrease of the clutching action incident to the lessening of the centrifugal force at relatively low R. P. M. of the engine.

13. The combination with an internal combustion engine, of a driven member to be driven by the engine, a centrifugal clutch for establishing a connection between the engine and the driven member, said clutch having driving and driven members and having centrifugally actuated means carried by a clutch driving member, for engaging and releasing the clutch in accordance with the speed of rotation of said clutch driving member, control means operable by differential pressures and operating off the fuel intake piping of the engine for acting upon the clutch, said control means being co-ordinated with the centrifugal clutch to effect certain increase in the clutching action upon a decrease of the clutch action incident to the lessening of the centrifugal force at relatively low R. P. M. of the said clutch driving member.

14. In combination with a clutch automatically engageable above a predetermined rotative speed, a suction clutch operator adapted to permit said clutch to engage regardless of the rotative speed and operative to disengage said clutch at high degrees of suction when the rotative speed is below the predetermined speed, and means for delaying the movement of said suction clutch operator from its clutch disengaging position to its inactive position whereby to provide a predetermined delay in clutch engagement sufficient to properly pick up the load under extreme operating conditions.

15. In combination with a clutch automatically engageable above a predetermined rotative speed, a suction clutch operator adapted to permit said clutch to engage regardless of the rotative speed and operative to disengage said clutch at high degrees of suction when the rotative speed is below the predetermined speed, and manually operable means cooperating with said clutch operator adapted to disengage said clutch regardless of the operation of either the automatic or suction clutch engaging mechanism.

16. In combination with a clutch automatically engageable above a predetermined rotative speed, a suction clutch operator adapted to permit said clutch to engage regardless of the rotative speed and operative to disengage said clutch at high degrees of suction when the rotative speed is below the predetermined speed, means for delaying the movement of said suction clutch operator from its clutch disengaging position to its inactive position whereby to provide a predetermined delay in clutch engagement sufficient to properly pick up the load under extreme operating conditions, and manually operable means cooperating with said clutch operator adapted to disengage said clutch regardless of the operation of either the automatic or suction clutch engaging mechanism.

17. The combination with an internal combustion engine having an intake manifold and an accelerator, of a clutch mechanism including driving and driven members, friction discs and a pressure plate contributing to form an operative connection between said members, clutch springs for effecting displacement of said pressure plate toward said driving member to complete clutch engagement, centrifugally controlled members operative by said driving member and acting to effect displacement of said pressure plate toward said driving member to complete clutch engagement, holdback springs for holding said centrifugally controlled members in retracted position at low speeds of the driving member but yieldable to permit said last named members to effect clutch engagement at high speeds of the driving member, clutch release means, and a vacuum clutch control operatively connected to said clutch release means and in communication with said intake manifold for effecting lateral displacement of said centrifugally controlled members selectively to effect clutch engagement by the clutch springs or by the centrifugally controlled members in response to the speeds of the driving member and the vacuum condition in the intake manifold.

18. The combination with an internal combustion engine having an intake manifold, a carburetor communicating with the intake manifold, a throttle valve in said carburetor adjacent said intake manifold and an accelerator operatively connected to said throttle valve, of clutch mechanism including driving and driven members, friction discs and a pressure plate contributing to form an operative connection between said members, clutch springs for effecting displacement of said pressure plate toward said driving member to complete clutch engagement, centrifugally controlled members operable by said driving member and acting to effect lateral displacement of said pressure plate toward said driving member to complete such engagement, holdback springs for holding said centrifugally controlled members in retracted position at low speed of said driving member but yieldable to permit said last named members to effect clutch engagement at high speed of the driving member, clutch release means, a vacuum clutch control operatively connected to said clutch release means, means for establishing communication between the interior of the intake manifold at a point on the intake manifold side of the throttle valve and the vacuum clutch control for controlling the operation of the vacuum clutch control by said accelerator.

19. In an automatic clutch mechanism for an internal combustion engine, driving and driven members mounted for engagement and disengagement, speed responsive means for forcing the members into engagement, resilient means tending to force the members into engagement, a control element shiftable by differential pressures and operably connected to the clutch mechanism, said control element being exposed to atmospheric pressure on one side, means connecting the engine intake manifold to the opposite side of said control element to expose said opposite side to intake manifold pressure which varies with the speed of and torque transmitted by the engine, and means exercising a governing influence upon the pressure variations, whereby in response to certain pressure changes said control element shifts so as to move the clutch members comparatively rapidly toward disengaged condition against the action of the resilient means and upon certain other pressure changes said control element shifts so that said clutch members move at a slower rate towards engaged condition.

ERNEST E. WEMP.